July 1, 1924.

A. E. OSWALD

EXHIBITION DEVICE

Filed Oct. 11, 1920

Inventor:
Alfred E Oswald
by B.C. Stickney Attorney

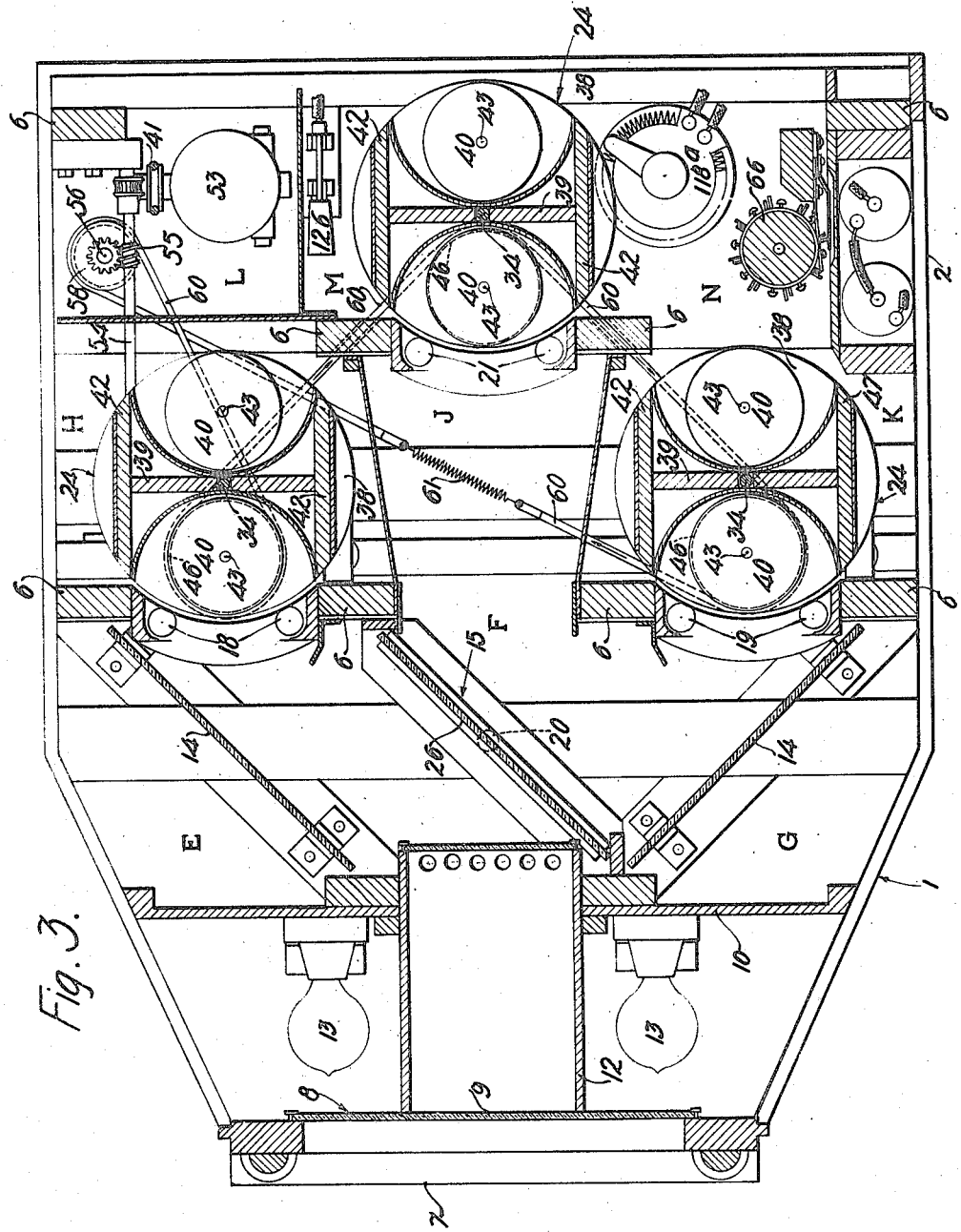

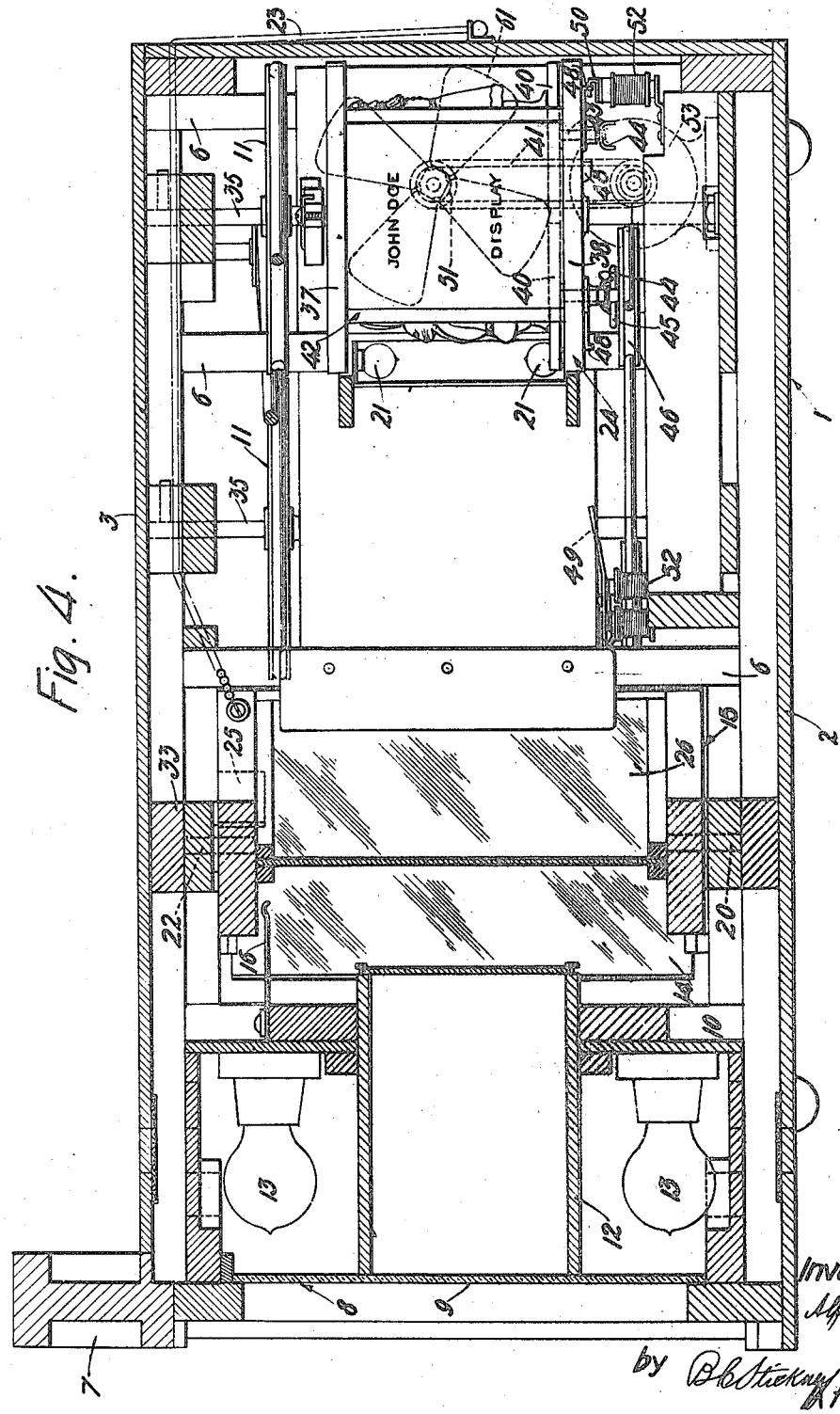

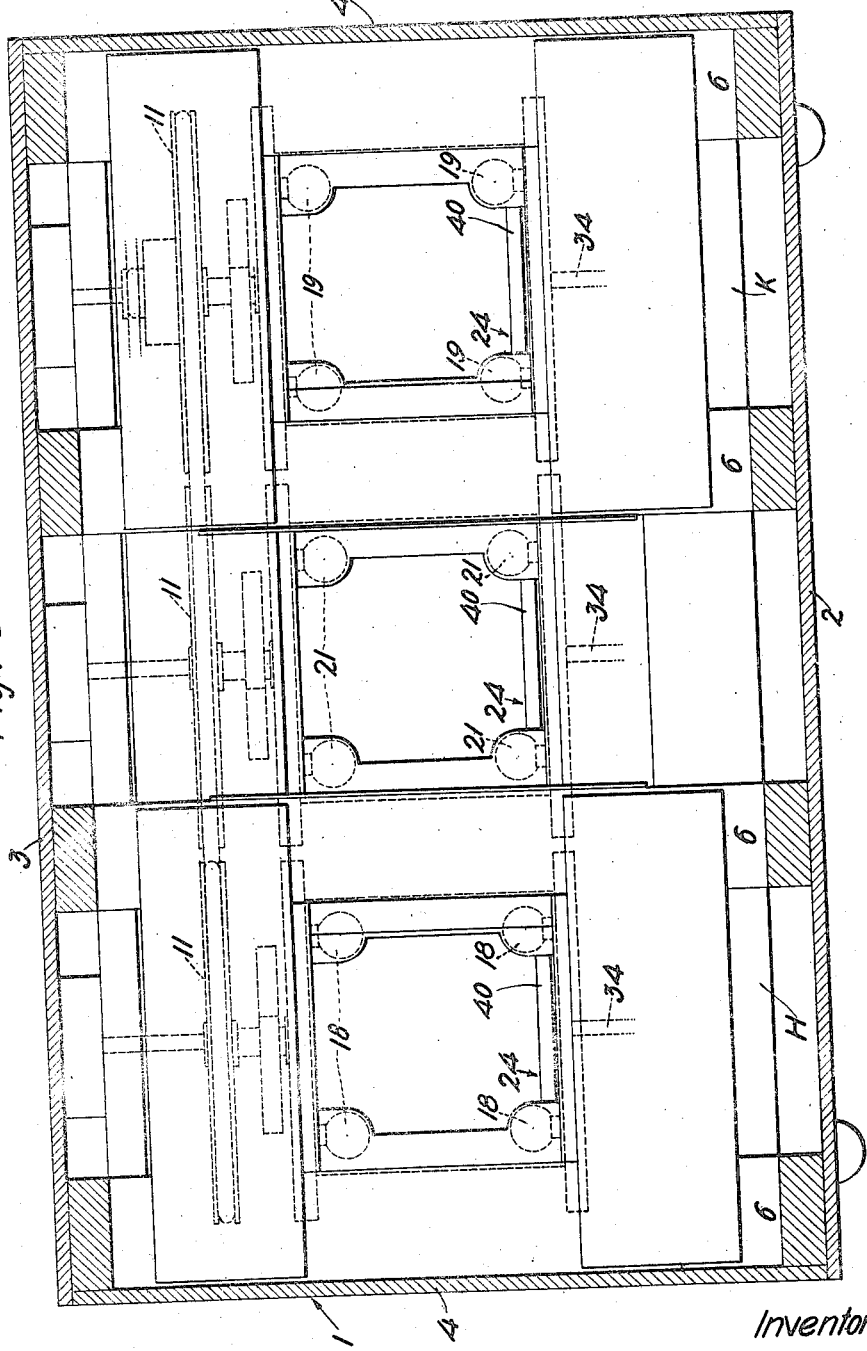

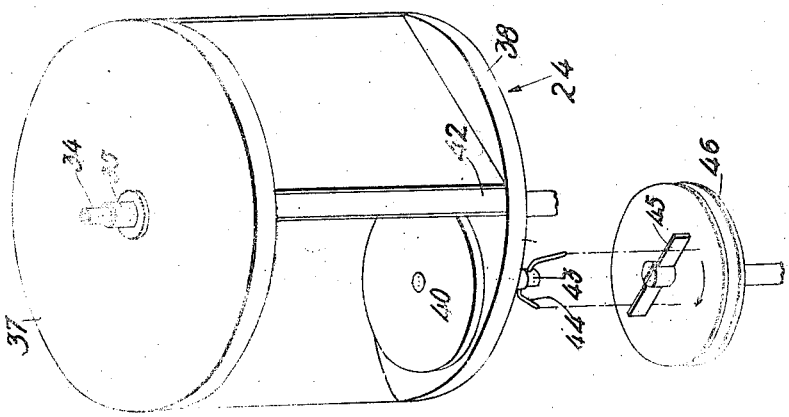
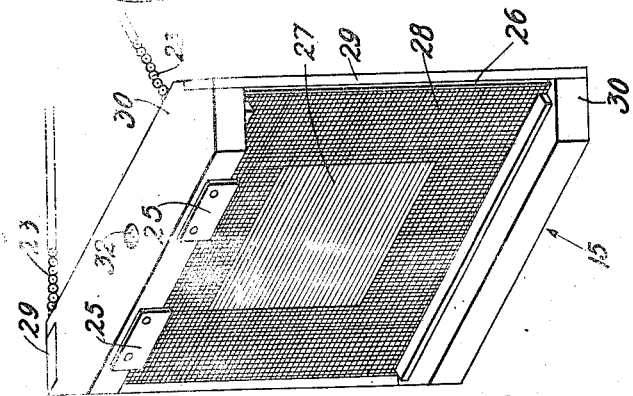
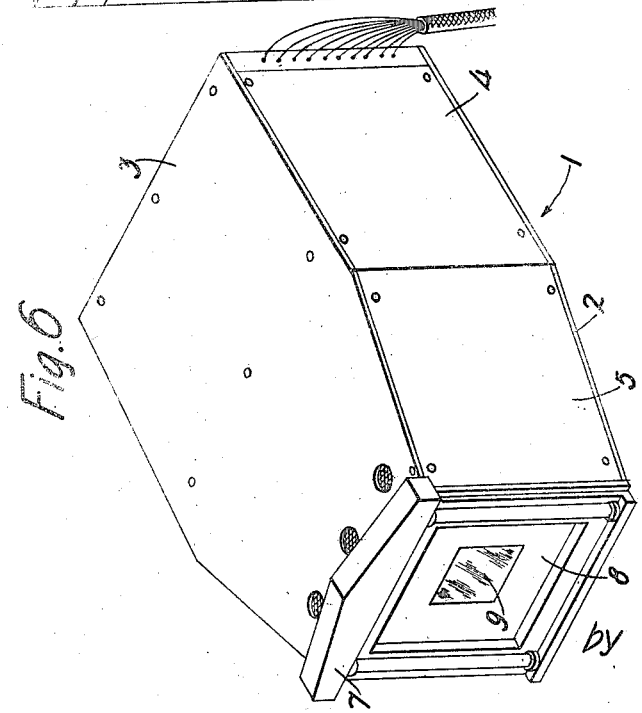

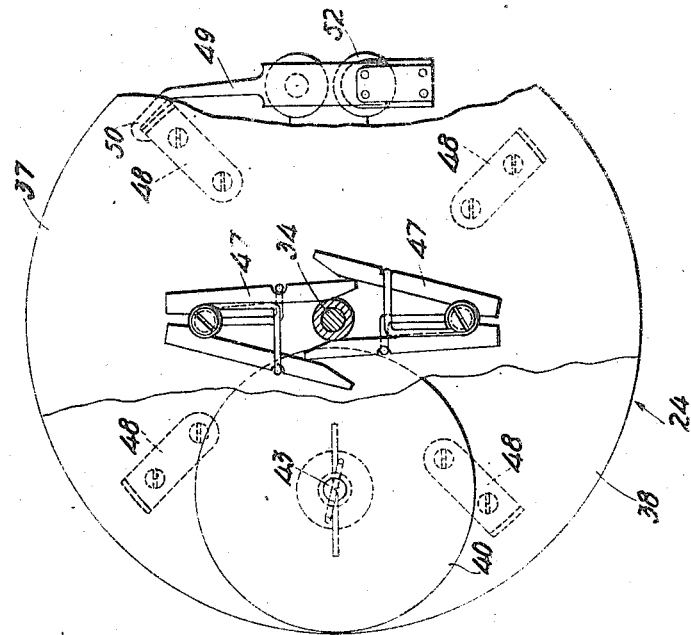
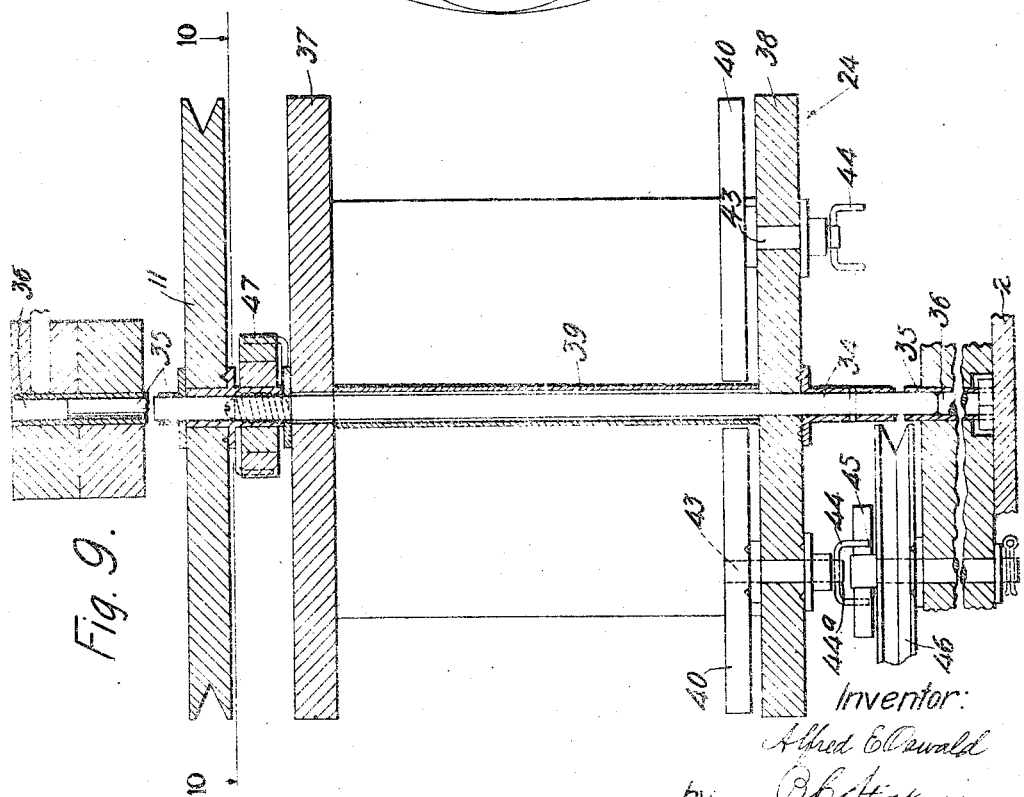

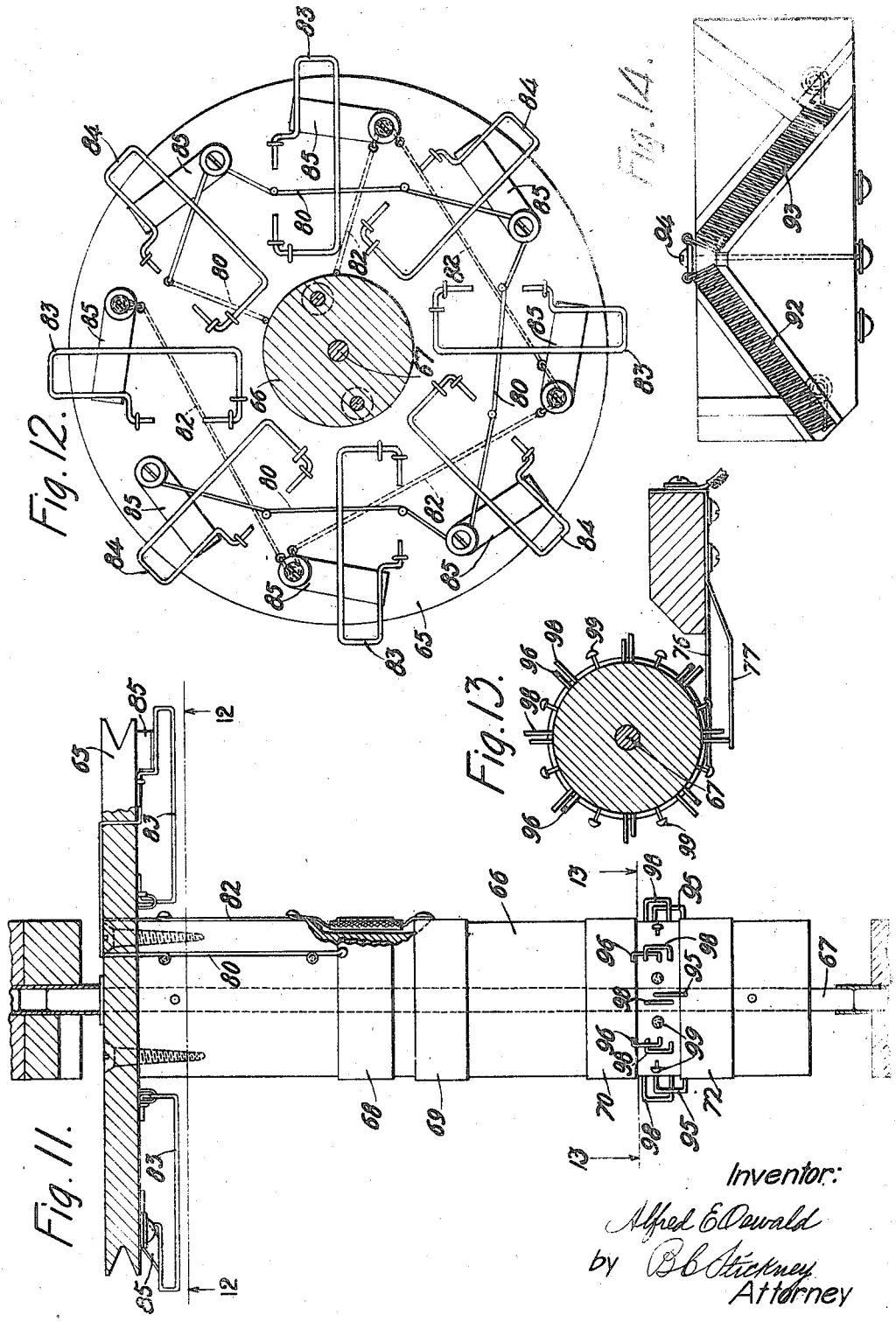

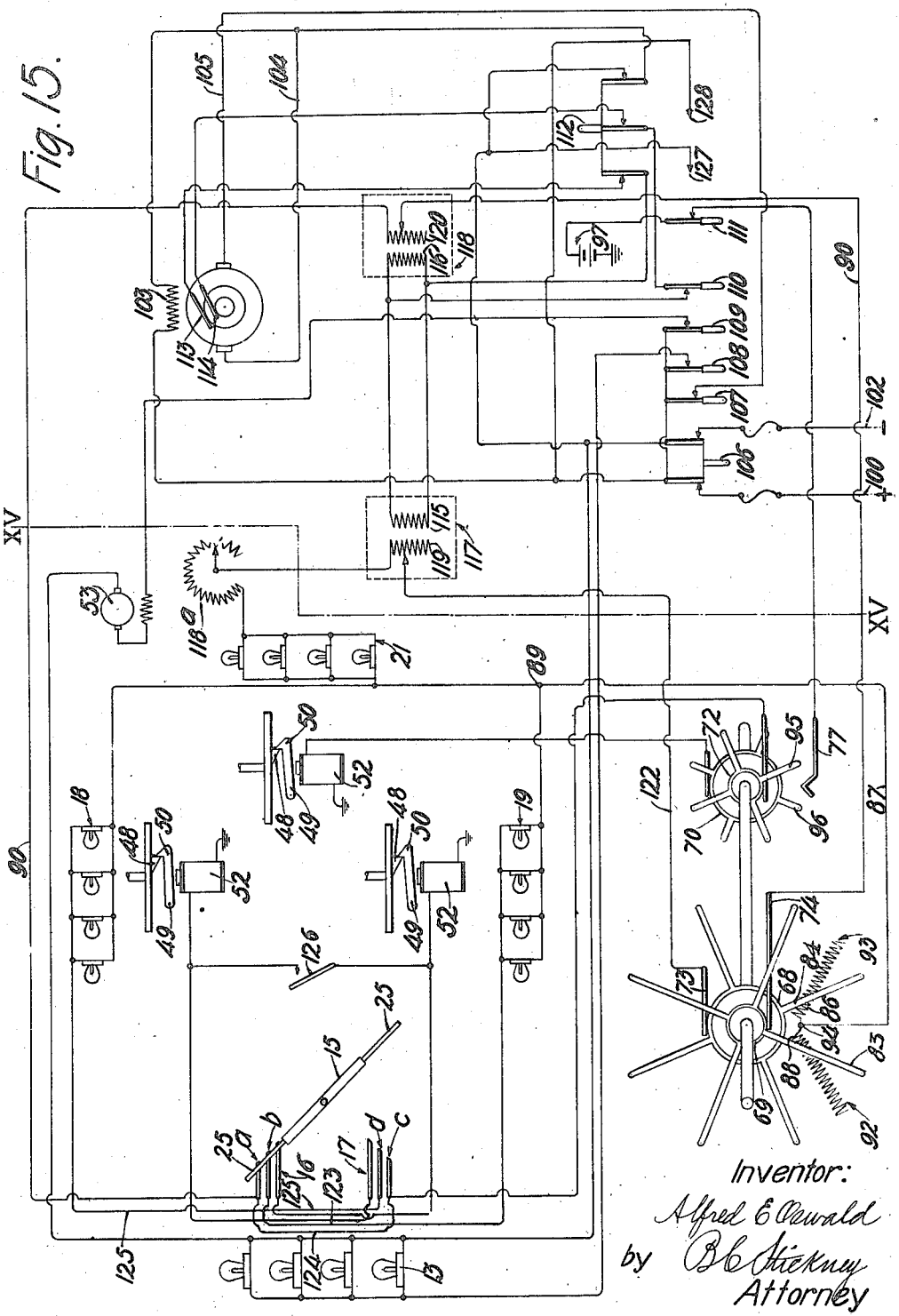

Patented July 1, 1924.

1,499,400

UNITED STATES PATENT OFFICE.

ALFRED E. OSWALD, OF BOGOTA, NEW JERSEY, ASSIGNOR TO UNDERWOOD TYPEWRITER COMPANY, OF NEW YORK, N. Y., A CORPORATION OF DELAWARE.

EXHIBITION DEVICE.

Application filed October 11, 1920. Serial No. 416,247.

*To all whom it may concern:*

Be it known that I, ALFRED E. OSWALD, a citizen of the United States, residing in Bogota, in the county of Bergen and State of New Jersey, have invented certain new and useful Improvements in Exhibition Devices, of which the following is a specification.

This invention relates to exhibition devices of the general type shown in the Wayrich Patents, Nos. 1,154,950 and 1,299,523. The general object to be accomplished is substantially the same as that set forth in the above-mentioned patents, namely, the presentation of a number of successive images which blend in passing from one to the other. The present invention embodies improvements over the Wayrich patents, particularly in accomplishing the desired result more effectively by automatic means instead of by hand-operated means.

The specific features of this invention comprise the following:

1. The presentation of a series of views in succession, the views merging as they pass from one to the other.

2. The provision of three sets of exhibits or displays, a center set and two side sets, the latter being reflected by means of mirrors, and means whereby the views of the central set and either of the two side sets may be shown alternately. Means are also provided whereby either side set and its accompanying lights may be rendered effective by the rotation of a central reflector.

3. The provision of automatic means for dimming the lights of one set of objects and simultaneously brightening the other set.

4. Automatic means for changing the views of the darkened set.

5. Means for rotating any object upon the platform while in view.

6. The provision of a colored plate glass which does not obstruct the image when looking directly through it and which acts like a mirror surface when used as a reflector to reflect the images of objects.

Other features and advantages will hereinafter appear.

In the accompanying drawings,

Figure 3 is a sectional plan view taken on the line 3—3 of Figure 1, and shows more clearly the lower driving mechanism for the secondary platforms.

Figure 4 is a section taken on the line 4—4 of Figure 2, and shows the apparatus on the right-hand side of the device.

Figure 5 is a sectional elevation taken on the line 5—5 of Figure 2, and shows the method of lighting the objects on the platform.

Figure 6 is a perspective of the complete housing, showing the method of connecting the electrical conductors.

Figure 7 is a detail view of the vertical glass plate which serves as a window when viewing a rear object, and as a reflecting surface when viewing a side object.

Figure 8 is a detail view of the exhibit platform, showing the secondary rotating platform mounted in the main platform, and, below the secondary platform, the driving means therefor.

Figure 9 is a vertical section of the platform of Figure 8, together with its mounting in the frame, showing both main and secondary driving pulleys, and the frictional connection between the main pulley and the shaft.

Figure 10 is a sectional view of the device in Figure 9 taken on the line 10—10 of Figure 9, and shows the electro-magnetic clutches in engagement with the lugs on the bottom of a main platform.

Figure 11 is a view, partly in section, of the contact-bearing shaft, and showing also the brushes adapted to co-operate with the coil resistances of the light-dimming apparatus, and the connection of the brushes with the contacts in circuit with the lights.

Figure 12 is a section taken on the line 12—12 of Figure 11, and shows the arrangement of the brushes of the light-dimming apparatus.

Figure 13 is a section on the line 13—13 of Figure 11, showing the brushes, and, in addition, the contacts which govern the electro-magnets controlling the rotation of the main platforms.

Figure 14 is a view of the resistance coils, and in contact with which the brushes of Figure 12 are adapted to travel, shown also in Figures 1 and 2.

Figure 15 is a diagrammatic representation of the electric wiring.

Figure 2:
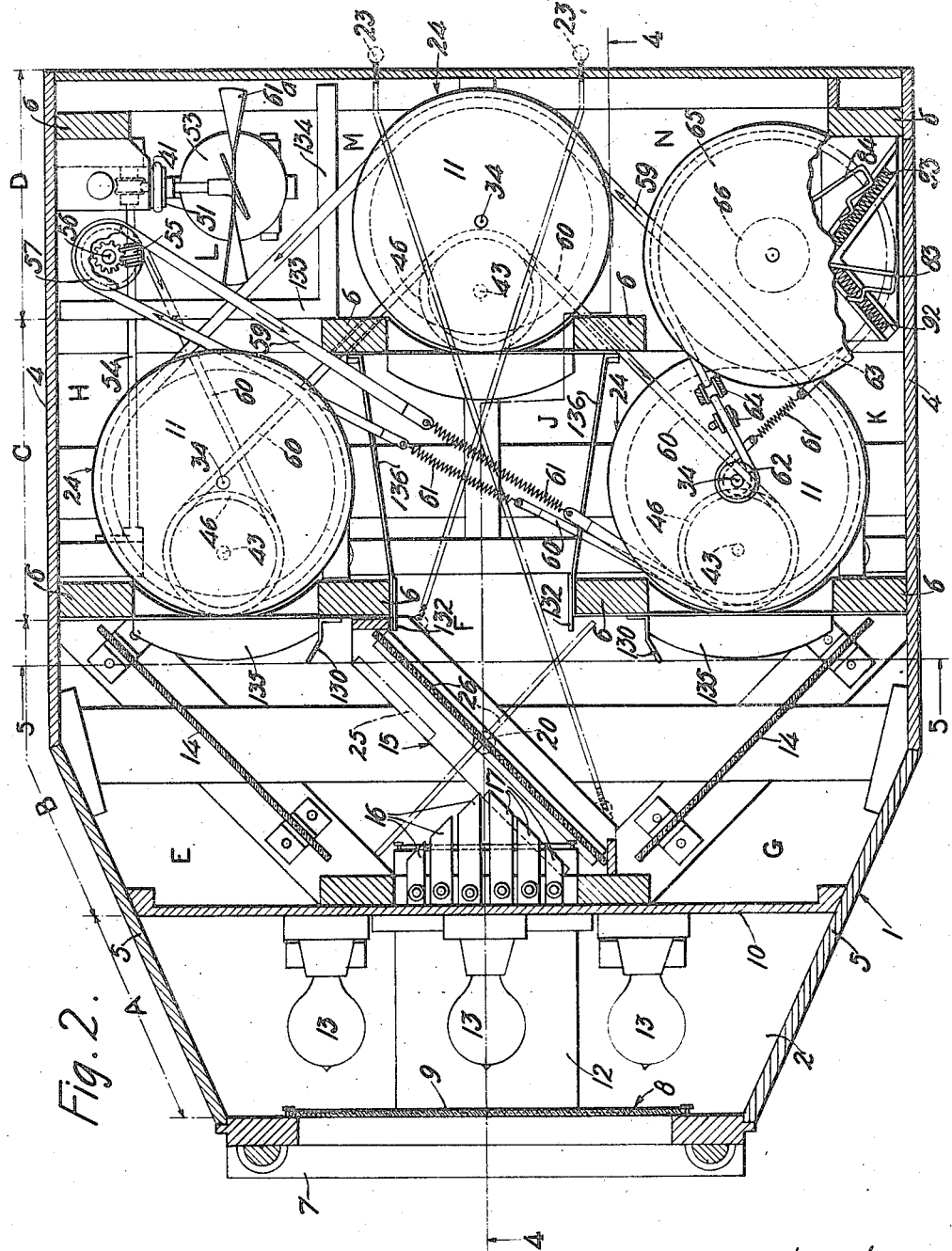
Figure 2 is a sectional plan view taken on the line 2—2 of Figure 1.

The invention is contained within a housing 1, which is a box-like structure, built in the usual manner and shown in perspective in Figure 6 and in cross-section in Figure 2. The box comprises a floor portion 2, roof portion 3, and side portions 4, the latter sloping towards the front, as shown at 5 in Figure 2. The floor portion and roof portion are held in place by vertical posts 6 positioned substantially as shown in Figure 2, so as not to interfere with the direct or reflected view of the object.

For convenience, the box may be considered as divided into four sections, A, B, C and D (Figure 2). Section A comprises the front wall formed into a frame 7 or other ornamental structure, and comprising a translucent member 8 provided with a central transparent portion 9. The rear wall of sub-division A is a solid member 10, with the exception of an opening corresponding to the transparent portion in the front wall. A box-like structure 12 connects the opening in the back wall and the transparent portion in the front wall. The lights 13 are positioned around this box-like structure to illuminate the translucent front wall.

Sub-division B may be considered as comprising three portions, E, F and G; in the end portions E and G are placed mirrors 14 at an angle of 45° to the front wall and converging thereto. In the central portion F of sub-division B is placed the pivoted reflector 15 co-operating with the sets of contacts 16 and 17 on the rear wall of sub-division A, said contacts controlling either of two sets of lights 18 and 19. The central reflector is pivoted in the housing on the pegs 20 and 22, and may be rotated to co-act with either mirror by means of chains 23 connected thereto and operated from the rear by hand or by any ordinary circuit-closing mechanism.

In the sub-division C there are substantially three compartments, H, J and K. In each of the compartments H and K is mounted a platform 24 (see Figure 8) carrying the object or objects to be exhibited. J is merely a passageway providing a darkened section and leading to the object in the rear sub-division.

The rear sub-division D may likewise be considered as consisting of three compartments, L, M and N. In the center compartment M is mounted a platform carrying objects to be exhibited. In the compartment L is mounted the motor-drive for the platform and object-rotating mechanism, and for the armature-controlling mechanism. In the compartment N is mounted the light-dimming mechanism and the shaft carrying the contact rings controlling the electro-magnetic platform releases and the various banks of lights.

The above description of the housing contains a short statement of the general positioning of the elements comprising this invention. These elements will now be described more in detail.

It is apparent from Figure 2 and the above description of the positioning of the various elements that the objects on the rear platform 24 in section M can be viewed directly from the transparent opening in the front wall looking through the pivoted reflector. The objects on the side platforms 24, however, are reflected through their corresponding mirrors, and then to the pivoted reflector, which now acts like a mirror, due to the fact that it is slightly colored, the coloration forming a necessary backing acting like a carbon deposit on the rear face; the reflected image may then be viewed from the front transparent portion in the position shown in Figure 2. The object on the platform in H' will be reflected from the mirror 14 in E to the pivoted reflector, and can thus be viewed from the front. In order to view the objects on the platform in K, it is necessary to rotate the pivoted reflector to the dotted position; this is done by means of the chains 23 operated from the rear of the housing. The pivoted reflector carries brushes 25 near its upper surface (see Figure 7), which co-operate with the two sets of contacts to light up the platform with which the pivoted reflector co-operates. Wiring necessary to accomplish this is shown diagrammatically in Figure 15, and will be hereinafter set forth more in detail. The rear platform 24 may be referred to as a primary platform and the side platforms 24 as secondary platforms.

The box-like structure 12 between the rectangular portion of the front wall and the similarly shaped opening of the rear wall of sub-division A is merely for the purpose of providing a tube or chute through which the observer may look into the interior of the housing. The lights positioned around the tube are for the purpose of illuminating the translucent portion 8 of the front wall and serve the additional purpose of blinding the darkened interior while the views are changing, thus making the illusion of merging images more complete.

The pivoted reflector is placed directly in the line of view of one looking through the tube; being merely a tinted glass plate, one may look directly through it to an object in the rear. It has been found, however, that giving the glass a slight coloration provides a sufficient backing for the glass to enable it to act as a reflecting surface when an image is projected thereon at an angle. The pivoted reflector, therefore, reflects the images of the objects on the platforms in H and K, which are first reflected from the mirrors 14 in E and G. The structure of the pivoted reflector is shown in Figure 7, and comprises a plate 26 having a central tinted portion 27 and a darkened border 28, the plate being set in a wooden frame comprising side members 29 and end members 30, the latter having central openings 32 adapted to co-operate with the pegs 20 and 22 in the floor and roof portions of the housing. The portion 33 carrying the upper peg is removable to enable the pivoted reflector to be removed from the housing. The upper end member carries the brushes 25 which co-operate with the contacts governing the lighting of the platforms in H and K.

Figure 1:
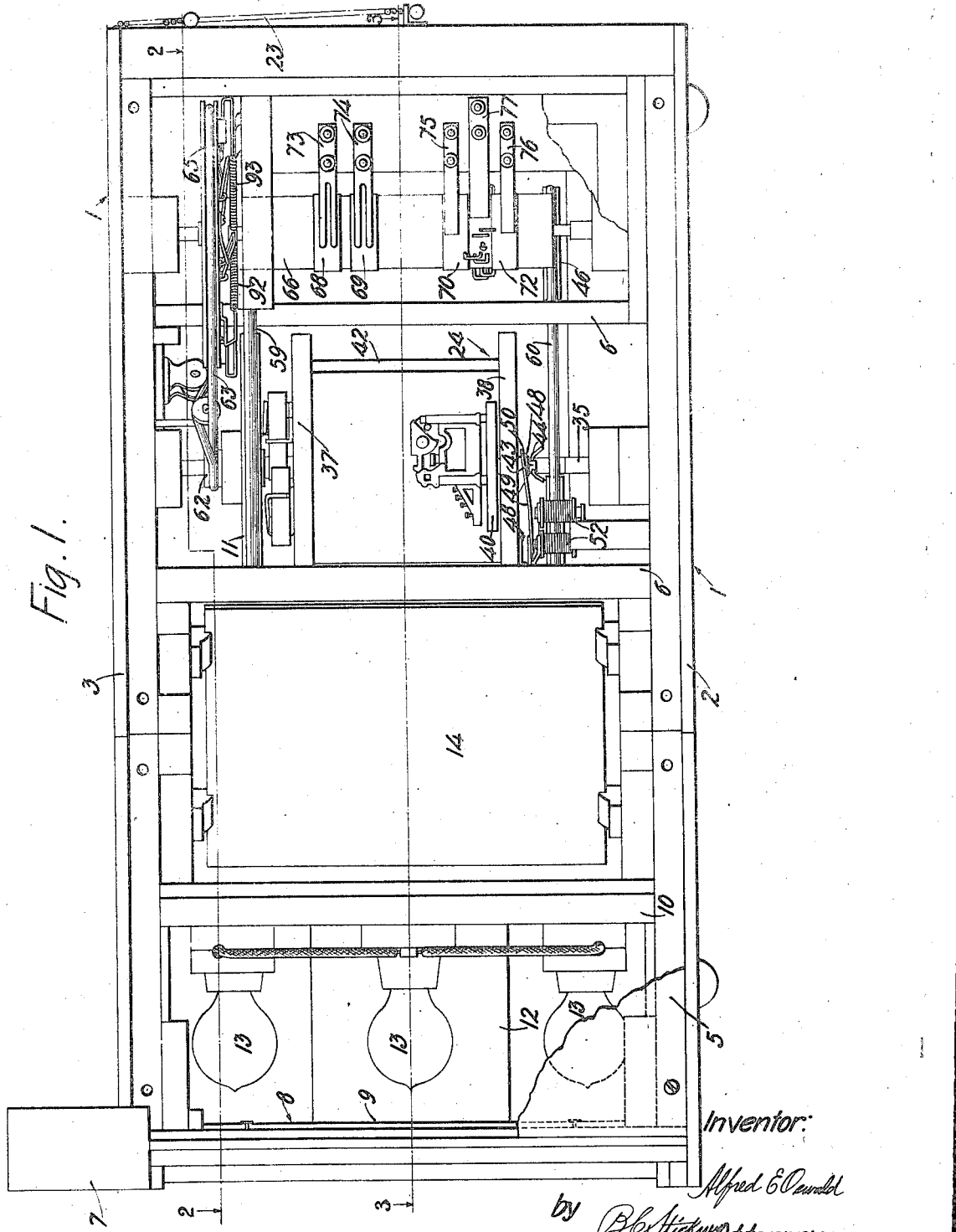
Figure 1 is a view taken from the left-hand side of the device shown in perspective in Figure 6, the corresponding side panels having been removed. The mirror, platform, and other apparatus on the left-hand side are shown.

The mirrors in E and G are ordinary reflecting surfaces with slivered rear surfaces and fixed between the floor and roof portions of the housing, as shown in Figure 1; they are set at an angle of 45° to the front wall and converging thereto.

The platforms 24 in H, K and M are similar in construction, and are shown more in detail in Figures 8, 9 and 3. Each platform has running through it a shaft 34 journaled in tube portions 35 in the floor and roof portions of the housing. The shaft is supported between end pegs 36 to give a metal-to-metal wearing surface. Each platform comprises a top member 37, a bottom member 38, and vertical supporting members 39. As shown in Figure 3, provision is made for two compartments having secondary platforms 40 upon which rotating objects are to be exhibited and two walls 42 upon which flat pictures or posters are adapted to be attached. As shown in Figure 1, the secondary platform 40 on the platform 24 in compartment M is utilized to support a typewriter. The view in Figure 8 shows one of each, while in Figure 3 may be seen the cross-section showing the position of all four objects or views. The secondary platforms are mounted on shafts 43 journaled in the bottom members 38, the shafts terminating in projecting U-shaped members 44 pivoted at 44$^a$ in the lower ends of shafts 43 and having their ends extending downwardly to co-operate with the upstanding members or fins 45 on the pulleys 46 journaled in the floor portion of the housing in proximity to the projecting members. From Figure 9 one may observe that the secondary platform will not be rotated unless the projecting members are in the position to co-operate with the upstanding members on the lower pulleys (which are constantly rotating, as will be explained), and this co-operating position is the one where the object on the secondary platform is in position to be viewed from the front. Each member 44, pivoted at 44$^a$, disengages member 45 when the main platform rotates. If the members 44 were rigidly secured in the ends of shafts 43, they might engage the fins 45 in such manner as to stop the movement of the main platform before the latter reached the proper position for exhibiting an article on one of the secondary platforms. As a result of the pivoted support of the members 44, each of them may be swung aside by the fins 45 as the corresponding secondary platform is positioned over the pulley 46 to which the fins 45 are connected, and, as the pulley rotates slowly, the fins 45 will move to a position to let the ends of member 44 drop on opposite sides thereof, thereby establishing a driving connection between the pulley 46 and the secondary platform 40. By referring to Figure 9, it will be seen that the shaft running through the main platform is journaled at its lower end in a hollow bushing on the floor portion of the housing, and that its upper end terminates within a similar hollow bushing upon which is mounted one of the upper pulleys 11. The pulley ordinarily rotates upon the platform shaft, but there is provided a friction clutch (shown in Figure 10) comprising spring-clips 47 fixed to the upper member 37 of the main platform which normally tends to cause the pulley and main platform to rotate together. However, there are provided on the lower member of the main platform lugs 48 co-operating with an armature 49 of an electro-magnet 52. The hooked end or catch 50 of the armature grips one of the lugs and holds the platform in fixed position, the pulley rotating alone, the grip of the armature on the lug being sufficient to overcome the frictional engagement between the pulley and the platform. When a change of views is desired, or when, in the automatic operation of the device, a change of views becomes due, the electro-magnet 52 draws down the armature 49, thus releasing the platform and enabling it to rotate with the pulley until another lug 48 comes into contact with the end of the armature; or, in other words, until another object has come into position to be viewed. The electrical connection, which periodically releases the armature and thus enables the platform to rotate and produce a change of views, will be described in connection with the electrical diagram in Figure 15. It should be noted here, however, that the electro-magnet draws down the armature only for a small interval of time sufficient to release a lug. The armature is released immediately thereafter so as to be in position to engage the next lug.

The upper and lower sets of pulleys are driven by a belt from a motor 53 (see Figures 2 and 3). Since each main platform has associated therewith one upper pulley 11 (by which it may be driven) and one lower pulley 46 (by which the secondary platforms may be driven), there will be in this case three upper and three lower pulleys, separate belts being provided to drive each set. A motor is provided which drives a right-angularly-disposed horizontal shaft 54, the latter carrying a worm gear 55 geared to a vertical shaft 56 having fixed thereto a pulley 57 at its upper end (see Figure 2) and another pulley 58 at its lower end (see Figure 3). The upper belt 59 can be traced in Figure 2 as running from the upper pulley 57 on the driving shaft to the upper pulleys 11 in K, M and H, around H to the upper pulley 57; the lower belt 60 can best be traced in Figure 3 and passes around the lower pulleys 46 in substantially the same order as the upper belt passes around the upper pulleys 11. It will be seen, however, that the upper belt 59 and the lower belt 60 pass around the respective pulleys 57 and 58 in opposite directions, so that the direction of rotation of the secondary platforms will be the opposite of that of the main platforms. The upper pulley in compartment K carries an additional small pulley 62 around which runs a separate belt 63 guided by two rolls 64 around a pulley 65 on the upper end of the contact-bearing roller 66 to be described below (see Figure 11). In each case the belt is shown as comprising a tension portion such as 61 to take up slack and maintain the belt in proper engagement with the pulleys. A tension belt 41 connects the motor shaft and a pulley 51 fixed on a shaft journaled in the frame. A fan 61ª is mounted on the end of the shaft running through the pulley 51 for regulating the speed of the motor, the fan being selected of a size sufficient to use up enough work done by the motor to bring its speed to the desired rate. The fan also supplies air to the inside of the housing, thus cooling the interior.

From the above description, it is apparent that some means must be provided whereby the electro-magnets may be released at the desired moment, to allow rotation of the main platform to another view, and also means must be provided to darken the old view while lighting up the new view. This is accomplished by the mechanism in compartment N, shown more in detail in Figures 1 and 11 to 14, inclusive, and comprising a roller 66 fixed to a shaft 67 journaled in hollow bushings in the floor and roof portions of the housing and driven by the belt-and-pulley connections described above.

The contact-bearing roller 66 is provided with two sets of ring contacts, the upper set comprising two spaced rings 68 and 69, and the lower set likewise comprising two spaced rings 70 and 72 with contacts positioned between the rings and arranged so as to alternately communicate with the rings as shown. Provision is made for brushes 73, 74, 75 and 76 to contact with the ring contacts 68, 69, 70 and 72, respectively, and, in addition, for a brush 77 to sweep over the contacts between the lower rings 70 and 72. Lead wires 80 and 82 project down the roller to contact with rings 68 and 69, respectively, and, as shown in Figure 12, the wire 82 is connected with alternate brushes designated by 83 and the wire 80 is connected with alternate brushes designated by 84 on the bottom of the pulley fixed to the roller. The brushes are pressed by springs 85 into engagement with the resistance coils 92 and 93 shown in Figure 14. It will be seen that the springs 85 form part of the connections between the wires 80 and 82 and the sets of contacts 84 and 83, respectively. One set of brushes is connected in circuit with the rear bank of lamps 21, and the other set is connected with one of the side banks 18 or 19, depending upon the position of the pivoted reflector 15. Referring now to Figure 15, it will be seen that the circuit which includes the contact ring 68 passes around such ring to the brush 84 in contact with the resistance wire through the portion 86 of the resistance coil to the wire 87 to the rear bank of lamps, and returns through the brush 73 to the contact ring 68. The circuit which includes the contact ring 69 passes through one of the brushes 83 along the portion 88 of the other resistance coil to the wire 87, branching off at 89 to the side banks of lamps 18 or 19, here 19, the side depending upon the position of the pivoted reflector, thence to wire 90 and return to the brush 74 and ring 69. It will be seen that as the brushes 83 and 84 at the bottom of the pulley 65 rotate, a brush of one set rides out on the resistance coil 92, thus increasing the resistance in the circuit and dimming the corresponding set of lamps, while a brush of the other set rides in along the resistance coil 93 to the contact point 94 or point of zero resistance, thus increasing the illumination given out by the other set of lights. Further rotation will swing the first brush off the resistance coil 92 while the second brush begins to ride up on this resistance coil, thus dimming the lights. Meanwhile, another brush of the first set will begin riding down on the first resistance coil 93, thus increasing the intensity of the illumination. It will thus be seen that the rear lights and one set of side lights (the particular one depending upon the position of the pivoted reflector) will alternately dim and brighten. Since as much resistance is cut out of one circuit as is cut into the other, the sum of the illumination of the rear platform and the illumination of a side platform will equal the full illumination of one view.

The control of the electro-magnets, which govern the rotation of the main platform to the new position, is accomplished by means of the lower contact rings 70 and 72 and the intermediate contacts 95 and 96. It will be observed that these contacts 95 and 96 are spaced so that those contacting with one ring alternate with those contacting with the other ring. Referring again to Figure 15, it will be seen that the circuit including the ring 70 passes through the rear electro-magnet 52 controlling the platform in M and the return (shown as grounded) actually goes to the battery 97 through the switch 111 to the third brush 77, closing the circuit at the contacts 96. The circuit through the ring 72 travels a similar course, substituting the side electro-magnets controlling the side platforms for the rear electro-magnet. It will be seen that as the roller rotates, the third brush 77 will alternately contact for a moment with the contacts 95 and 96, thus closing the circuit alternately through the rear and side electro-magnets, and alternately drawing down the respective armatures to permit rotation of the corresponding platforms. Adjacent each contact 95 or 96 is a member 98 of greater height, adapted to lift the brush to give it a sharper contact as it snaps to the lower level. The third brush 77 ordinarily rides upon the pins 99 to keep it out of contact with the contact rings.

Referring to Figure 15, there will now be set forth such of the wiring of the apparatus as has not heretofore been explained. It will be noted that the dotted line XV—XV runs approximately down the center of the sheet. The apparatus to the left of this line is contained within the main housing, while the apparatus to the right of the line is auxiliary and may be contained in the separate structure, the apparatus to the right comprising means for converting the direct current of the ordinary householder's circuit to alternating current which may be stepped down to the voltage of the small lamps used in the structure. If the ordinary full-sized lamps are used, this apparatus may be dispensed with, the D. C. current being led directly to the lamps. As shown, however, the circuit includes the converting mechanism.

When a direct current is to be used, the three-blade switch is positioned as shown in Figure 15, and, when the main switch 106, having two blades, is positioned as shown in Figure 15, current will flow through the field coil 103 of the converter and through the right-hand blade of the switch 112 to the negative pole 102. If the switch 107 is closed, the current will flow therethrough to the wire 105. This part of the current will pass through the converter and cause the same to rotate, the current passing from the converter to the wire or conductor 105 and to the negative pole 102 by the same path as the current through the field coil 103. The alternating current drawn off by the brushes 113 and 114 is utilized to energize the primary coils 115 and 116 of two transformers 117 and 118. If alternating current is supplied at the terminals 100 and 102, the converting mechanism may be dispensed with, the current being supplied directly to the transformers by swinging the three-blade switch 112 into engagement with contacts 127 and 128. In either case, the secondary coil 119 supplies current through the rheostat 118$^a$ (inserted for the purpose of adjusting the rear bank of lights to the same intensity as the side lights), thence through the rear lights 21, the portion 86 of the resistance coil 93, brush 84, contact ring 68, brush 73 and return wire 122. The circuit supplied by the other secondary coil 120 may include either of the side banks of lights through the contacts (the position of the pivoted reflector and its brushes determining which bank of side lights will be illuminated), wire 87, a portion of the resistance coil 92, the contact ring 69, the brush 74, and the wire 90. The path through the contacts 16 and 17, in the position of the pivoted reflector shown in Figure 15, leads from wire 90 to contact $a$ of set 16, thence to contact $b$ to wire 123 to lights 19. When the pivoted reflector is rotated to bring brushes 25 into engagement with the contacts of set 17, the circuit runs through wire 90, wire 124, contact $c$, contact $d$, wire 125, to lights 18.

The circuit through the electro-magnets has previously been traced, and it should be further observed that when the switch 126 is closed, both side electro-magnets are in the circuit, and hence both side platforms may rotate together while the rear platform is illuminated and fixed. By this arrangement, the positioning of the views of the various platforms relative to each other may be varied.

The front bank of lights 13 is of large size and can therefore be wired into the D. C. circuit, the current being drawn from the lead wires 100 and 102 and a switch 108 being provided in circuit with these lights to connect the same with the positive pole or wire 100. Also driven by the D. C. current is the motor 53, which drives the belts, the current being supplied by the lead wires 100 and 102 and controlled by the switch 109. The switch 110 controls the current through the two primary coils of the transformers, and therefore controls the banks of side lights. The last single-blade switch 111 controls the current through the electro-magnets supplied by the battery 97. As previously explained, the return wire is not shown, but is represented as grounded for the purpose of simplifying the diagram. The last switch 112 has two positions. In the position shown in Figure 15; it leads D. C. current to the converter. When A. C. current is supplied at the terminals 100 and 102, the switch 112 is reversed, and the converter is thrown out of the circuit, the switch engaging the contacts 127 and 128. In the latter position of the switch, A. C. current is led directly to the primary coils of the transformers.

The operation of the complete device is clear from the above description, but may be briefly stated as follows: The three-blade switch 112 is set for A. C. or D. C. current. The pivoted reflector 15 is set by the chains 23 in position so that one of the side platforms will alternate with the rear platform in the display. All of the switches are then thrown in, thus supplying the current, lighting the front lamps, rendering the lights of the one side and the rear exhibit effective, and starting the belt and pulley drive. Let us assume the parts as in Figure 2, the platform in H is alternating in display with the rear platform in M. Assuming that the brush beginning to ride up on the resistance coil 92 controls the lights of the side platform, the latter is now at its full illumination, since practically none of the coil resistance is in the circuit. The other brush controlling the rear lights is at the outermost end of the coil resistance 93, the full resistance is in circuit, and therefore the rear lights are dimmed. The secondary platform of the side main platform is in position to be viewed, and is now being rotated by the lower pulley. As the pulley 65 carrying the brushes rotates, however, the first brush rides up on the coil resistance 92, thus dimming the side lights while the second brush decreases the resistance, thus brightening the rear lights. When the rear lights have reached their fullest illumination, the brush on the lower contacts is adapted to close the circuit through the electro-magnet controlling the side platform, drawing down the armature and releasing the platform. The armature swings back but does not contact with an upper lug until the platform has rotated for a quarter turn to the new position. At this point another brush of the first series has begun to ride down the resistance coil 93, and increases the illumination of the side platform, while the brush of the second series is riding up on the resistance coil 92 and dimming the rear lights.

The disposition of the lights around the platforms is shown in Figure 5. As illustrated in Figure 2, double screen members 130 and 132 prevent the rays of light from passing into the darkened passage J leading to the rear platform. The interior walls of the housing are darkened, and, as far as possible, the platforms are surrounded by blackened screens, indicated in the drawings at 133, 134, 136 and 135.

Variations may be resorted to within the scope of the invention, and portions of the improvements may be used without others.

Having thus described my invention, I claim:

1. In an exhibition device, in combination, a rotatable main element, a plurality of exhibit-supports on said element, means to rotate said main element to bring any one of said supports to a display position, said supports including one which is mounted for independent rotation on said main element, means to rotate independently said rotatable support when the same is brought to the display position, and a housing enclosing said main element.

2. In an exhibition device, in combination, a rotatable main element, a plurality of exhibit-supports on said element, means to rotate said main element to bring any one of said supports to a display position, said supports including one which is mounted for independent rotation on said main element, means to rotate independently said rotatable support when the same is brought to the display position, a housing enclosing said main element, and means to permit any exhibit positioned at the display position to be viewed from the outside of the housing, said last-mentioned means comprising a sight-opening.

3. In an exhibition device comprising a housing having a front sight-opening, the combination of a rear platform and side platforms to be alternately displayed, means for reflecting said side platforms to said sight-opening, each of said platforms being mounted for rotation about a vertical axis, and means for continuously rotating said platforms, said last-named means comprising a pulley on each of said platforms and having frictional engagement therewith, a belt connecting said pulleys, and means for continuously driving said belt.

4. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, and means for stopping said platforms alternately at intervals in order that the objects they carry may be viewed.

5. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, and means overcoming the frictional engagement of the pulleys and platforms for normally holding the platforms against rotation with said pulleys.

6. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, and means overcoming the frictional engagement of the pulleys and platforms for normally holding the platforms against rotation with said pulleys, said last-named means comprising lugs on said platforms and co-operating electromagnets having armatures normally engaging said lugs and out of engagement with said electro-magnets.

7. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electromagnets having armatures normally engaging said lugs and out of engagement with said electro-magnets, and automatic means for rendering the electro-magnets effective to attract the armatures, thus releasing the platforms and allowing them to rotate to new positions.

8. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, means for continuously driving said belt, and means overcoming the frictional engagement of the pulleys and platforms for normally holding the platforms against rotation with said pulleys, said last-named means comprising lugs on said platforms and co-operating electromagnets having armatures normally engaging said lugs and out of engagement with said electro-magnets, and automatic means for rendering the electro-magnets effective to attract the armatures, thus releasing the platforms and allowing them to rotate to new positions, said automatic means being rendered ineffective before each armature reaches the next lug, so that it may engage said next lug.

9. In an exhibition device comprising a housing having a front sight-opening, the combination of a rear platform and a side platform to be alternately displayed, means for reflecting said side platform to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electro-magnets having armatures normally engaging said lugs and out of engagement with said electro-magnets, and automatic means for alternately rendering the electro-magnets of said side platform and rear platform effective to attract the respective armatures, thus releasing the platforms and allowing them to rotate to new positions.

10. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electro-magnets having armatures normally engaging said lugs and out of engagement with said electro-magnets, and automatic means for rendering the electro-magnets effective to attract the armatures, thus releasing the platforms and allowing them to rotate to new positions, said automatic means comprising electric circuits including said electro-magnets and a rotating roller having spaced contacts in said circuits, and a brush on said roller for closing said circuits when it reaches said contacts.

11. In an exhibition device comprising a housing having a front sight-opening, the combination of a rear platform and a side platform to be alternately displayed, means for reflecting said side platform to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electro-magnets having armatures normally engaging said lugs and out of engagement with said electro-magnets, and automatic means for alternately rendering the electro-magnets of said side platform and rear platform effective to attract the respective armatures, thus releasing the platforms and allowing them to rotate to new positions, said automatic means comprising separate electric circuits, one including the rear electro-magnet and the other the side electro-magnet, a roller having contacts forming part of each circuit, alternate contacts belonging to the same circuit, and a brush on said roller for alternately closing each of said circuits when it reaches a corresponding contact, thus alternately rendering the electro-magnets effective and alternately releasing the rear and side platforms.

12. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electro-magnets having armatures normally engaging said lugs and out of engagement with said electro-magnets, automatic means for alternately rendering the electro-magnets of said side platforms and rear platform effective to attract the respective armatures, thus releasing the platforms and allowing them to rotate to new positions, said automatic means comprising separate electric circuits, one including the rear electro-magnet and the other the side electro-magnet, a roller having contacts forming part of each circuit, alternate contacts belonging to the same circuit, and a brush on said roller for alternately closing each of said circuits when it reaches a corresponding contact, thus alternately rendering the electro-magnets effective and alternately releasing the rear and side platforms, and means for causing both side platforms to rotate together alternately with the rear platform.

13. In an exhibition device comprising a housing having a front sight-opening, the combination of a rear main platform and side main platforms to be alternately displayed, means for reflecting said side platforms to said sight-opening, each of said main platforms being mounted for rotation about a vertical axis, and secondary platforms mounted for independent rotation upon said main platforms.

14. In an exhibition device comprising a housing having a front sight-opening, the combination of a rear main platform and side main platforms to be alternately displayed, means for reflecting said side platforms to said sight-opening, each of said main platforms being mounted for rotation about a vertical axis, secondary platforms mounted for rotation upon said main platforms, continuously-rotating means for moving said main platforms, and independent means for continuously rotating the secondary platform which is in position to be displayed.

15. In an exhibition device comprising a housing having a front sight-opening, the combination of a rear main platform and side main platforms to be alternately displayed, means for reflecting said side platforms to said sight-opening, each of said main platforms being mounted for rotation about a vertical axis, secondary platforms mounted for rotation upon said main platforms, means for continuously rotating said main platforms, said last-named means comprising a pulley on each of said main platforms and having frictional engagement therewith, and a belt connecting said pulleys, means for continuously rotating said secondary platforms when they are in position to be displayed, said last-named means comprising pulleys beneath the secondary platforms when the latter are in displayed position and having upstanding members, depending members on said secondary platforms cooperating with the upstanding members, a second belt connecting said lower pulleys, and a driving shaft to which both of said belts are connected.

16. An exhibition device comprising, in combination, a housing, a sight device to limit the direct vision to a definite path through the housing, a plurality of exhibit-carriers in said housing but outside of said path, and means, including a reflecting device mounted for movement to different positions, to reflect an exhibit on any one of said carriers through the sight device.

17. In an exhibition device comprising a housing having a front sight-opening, the combination with a rear platform and side platforms, of a pivoted reflector comprising a slightly colored transparent plate through which the rear platform may be viewed directly and acting like a reflector to reflect the side platforms, the coloring of the plate providing the necessary backing, the reflector being rotatable so that it may co-operate with either of the side platforms.

18. In an exhibition device comprising a housing having a front sight-opening, the combination with a rear platform and side platforms, of a pivoted reflector comprising a slightly colored transparent plate through which the rear platform may be viewed directly and acting like a reflector to reflect the side platforms, the coloring of the plate providing the necessary backing, and mirrors for each of said side platforms, the reflector being rotatable so that it may co-operate with either of the side platforms, the mirror at each side being positioned parallel to the pivoted reflector when the latter is in a position to co-operate with that side.

19. In an exhibition device comprising a housing having a front sight-opening, the combination of a rear platform and side platforms, means for alternately exhibiting objects on the rear platform and on one of said side platforms, a pivoted reflector through which the rear platform may be viewed directly and acting like a reflector to reflect the side platforms, and means controlled by said reflector for rendering either of said side platforms effective to alternate in display with the rear platform.

20. An exhibition device comprising, in combination, a housing, a sight device to limit the direct vision to a definite path through the housing, a plurality of exhibit-carriers in said housing but outside of said path, and means, including a reflecting device mounted for movement to different positions, to reflect an exhibit on any one of said carriers through the sight device, said plurality of exhibit-carriers including a carrier provided with a plurality of exhibits.

21. In an exhibition device comprising a housing having a front sight-opening, the combination of a rear platform and side platforms, a pivoted reflector through which the rear platform may be viewed directly and acting like a reflector to reflect the side platforms, automatic means for alternately illuminating the rear and either of said side platforms, and selective means governed by the pivoted reflector for enabling either of said side platforms to be illuminated alternately with said rear platform.

22. In an exhibition device comprising a housing having a front sight-opening, the combination of a rear platform and side platforms, a pivoted reflector through which the rear platform may be viewed directly and acting like a reflector to reflect the side platforms, automatic means for alternately illuminating the rear and either of said side platforms, selective means governed by the pivoted reflector for enabling either of said side platforms to be illuminated alternately with said rear platform, said means comprising an electric circuit having two sets of contacts, one set of contacts for the illuminating means of each side platform, and brushes carried by the pivoted reflector and adapted in one position to co-operate with one of said two sets of contacts to close the circuit through the illuminating means of one side platform, and in the other position to co-operate with the second of said two sets of contacts to close the circuit through the illuminating means of the other side platform.

23. An exhibition device comprising, in combination, a housing, a sight device to limit the direct vision to a definite path through the housing, a plurality of exhibit-carriers in said housing but outside of said path, means, including a reflecting device mounted for movement to different positions, to reflect an exhibit on any one of said carriers through the sight device, said plurality of exhibit-carriers including a carrier provided with a plurality of exhibits, and means for bringing any one of the exhibits of the last-mentioned carrier to the display position.

24. An exhibition device comprising, in combination, a housing, a sight device to limit the direct vision to a definite path through the housing, a plurality of exhibit-carriers in said housing but outside of said path, means, including a reflecting device mounted for movement to different positions, to reflect an exhibit on any one of said carriers through the sight device, and means to illuminate each exhibit while it is reflected through said sight device.

25. An exhibition device comprising, in combination, a housing, a sight device to limit the direct vision to a definite path through the housing, a plurality of exhibit-carriers in said housing but outside of said path, and substantially at equal distances from the axis of said path, and means, including a reflecting device mounted for movement to different positions, to reflect an exhibit on any one of said carriers through the sight device.

26. In an exhibition device comprising a housing having a front sight-opening, the combination of a rear platform and a side platform, means for reflecting said side platform to said sight-opening, means for alternately exhibiting objects on the rear platform and on said side platform, including automatic means for alternately dimming the brightness of the platform being viewed and increasing the brightness of the other platform, so that the two views appear to merge, and comprising two electric circuits, one for each platform, illuminating means for each platform in said circuits, a pulley carrying brushes included in said circuits, alternate brushes being in the same circuit, and coiled resistances over which said brushes operate and so positioned that one brush increases the amount of resistance in its circuit as the other decreases the resistance, thus dimming the illuminating means of one platform while brightening the illuminating means of the other platform.

27. In an exhibition device comprising a housing having a front sight-opening, the combination of a rear platform and a side platform, means for reflecting said side platform to said sight-opening, means for alternately exhibiting objects on the rear platform and on said side platform, including automatic means for alternately illuminating the rear platform and said side platform, and automatic means for rotating each of the platforms to a new position when the respective platform is darkened.

28. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, automatic means for alternately illuminating the rear platform and said side platforms, and automatic means for releasing the holding means of the platforms to permit said platforms to rotate to new positions, said last-named means operating when the respective platform is darkened.

29. In an exhibition device comprising a housing having a front sight-opening, the combination of a rear platform and side platforms to be alternately displayed, means for reflecting said side platforms to said sight-opening, each of said platforms being mounted for rotation about a vertical axis, means for continuously rotating said platforms, said last-named means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electromagnets having armatures normally engaging said lugs and out of engagement with said electromagnets, automatic means for rendering the electro-magnets effective to attract the armatures, thus releasing the platforms and allowing them to rotate to new positions, and automatic means for alternately illuminating the rear platform and side platforms, said first-named automatic means rendering the electro-magnets effective to attract the armatures when the respective platforms are darkened.

30. In an exhibition device comprising a housing having a front sight-opening, the combination of a rear platform and a side platform to be alternately displayed, means for reflecting said side platform to said sight-opening, each of said platforms being mounted for rotation about a vertical axis, means for continuously rotating said platforms, said rotating means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electromagnets having armatures normally engaging said lugs and out of engagement with said electro-magnets, automatic means for alternately rendering the electro-magnets of said side platform and rear platform effective to attract the respective armatures, thus alternately releasing the side and rear platforms and allowing them to rotate to new positions, and automatic means for alternately illuminating the rear platform and side platform, said first-named automatic means rendering the electro-magnets effective when the respective platforms are darkened.

31. In an exhibition device comprising a housing having a front sight-opening, the combination of a rear platform and a side platform to be alternately displayed, means for reflecting said side platform to said sight-opening, each of said platforms being mounted for rotation about a vertical axis, means for continuously rotating said platforms, said rotating means comprising a pulley on each of said platforms and having frictional engagement therewith, a belt connecting said pulleys, and means for continuously driving said belt, means overcoming the frictional engagement of the pulleys and platforms for normally holding the platforms against rotation with said pulleys, said last-named means comprising lugs on said platforms and co-operating electro-magnets having armatures normally engaging said lugs and out of engagement with said electro-magnets, automatic means for alternately rendering the electro-magnets of said side platform and rear platform effective to attract the respective armatures, thus alternately releasing the side and rear platforms and allowing them to rotate to new positions, and automatic means for alternately illuminating the rear platform and side platform, and comprising illuminating means for each platform, two electric circuits, one for each platform, and automatic means for introducing a resistance into one circuit while reducing the resistance in the other, said electro-magnets being rendered effective when the greatest resistance is in the circuit of the corresponding platform.

32. An exhibition device comprising, in combination, a housing, a sight device to limit the direct vision to a definite path through the housing, a plurality of exhibit-carriers in said housing but outside of said path, means, including a reflecting device mounted for movement to different positions, to reflect an exhibit on any one of said carriers through the sight device, and means controlled by said reflecting device for illuminating each exhibit when it is to be reflected through said sight device.

33. An exhibition device comprising, in combination, a housing, a sight device to limit the direct vision to a definite path through the housing, a primary exhibit-carrier in said path of vision, a plurality of secondary exhibit-carriers in said housing but outside said path of vision, and a reflecting device comprising a plate extending across said path of vision in front of the primary exhibit-carrier and at such an inclination as to reflect a display on any one of said secondary carriers through the sight device, and at the same time to permit an exhibit on said primary carrier to be seen therethrough, said plate being shiftable to different positions to select any one of said secondary carriers, so that an exhibit on the selected secondary carrier will be reflected through said sight device.

34. In an exhibition device comprising a housing having a front sight-opening, in combination, a rotatable main element having exhibit-supports arranged therearound, so that, by rotation of said main element, an exhibit on any one of said supports may be positioned to be viewed through said sight-opening in said housing, said main element being opposite said sight-opening, a secondary rotatable element out of the path of vision of said sight-opening and having exhibit-supports arranged therearound to be brought to display position by rotation of said secondary element, reflecting means to permit any exhibit on the secondary element, when positioned at the display point corresponding thereto, to be viewed from the sight-opening, and means to cause said main element and said secondary element to be rotated alternately.

35. In an exhibition device comprising a housing having a front sight-opening, in combination, a rotatable main element having exhibit-supports arranged therearound, so that, by rotation of said main element, an exhibit on any one of said supports may be positioned to be viewed directly through said sight-opening, a second rotatable element out of the range of view of said sight-opening and having exhibit-supports arranged therearound to be brought to display position by rotation of said second element, reflecting means to permit any exhibit on the second element when positioned at the display point corresponding thereto, to be viewed from the sight-opening, means to rotate said main element and said second element alternately, and means to illuminate the properly positioned exhibits on said main element and said second element alternately.

36. An exhibition device, comprising, in combination, a rotatable main element having a plurality of exhibit-supports arranged around the same, means urging said main element to rotate, releasable detaining means to hold said main element with any one of said supports in display position, said supports including one which is mounted for independent rotation on said main element, and means to rotate said rotatable support independently when the same is brought to display position.

37. An exhibition device comprising, in combination, a rotatable main element having a plurality of exhibit-supports arranged around the same, means to rotate said main element to bring any one of said supports to a display position, said supports including one which is mounted for independent rotation on said main element, a constantly-rotating member, and connecting means whereby a connection will be established between said rotating member and the independently-rotatable support when the latter is brought to the display position.

38. An exhibition device comprising, in combination, a rotatable main element having a plurality of exhibit-supports arranged around the same, means to rotate said main element to bring any one of said supports to a display position, said supports including one which is mounted for independent rotation on said main element, a constantly-rotating member, and connecting means whereby a connection will be established between said rotating member and the independently-rotatable support when the latter is brought to the display position, said connecting means comprising a fin extending across the axis of the rotating member, and a U-shaped member, the base of which is pivoted in said rotatable support and extends across the axis thereof, and whose sides normally are parallel to the axis, so that, when the rotatable support is brought to display position, the fin will strike the sides of the U-shaped member and swing them to one side to enable the axis of the rotatable support to be brought into alignment with the axis of the rotating member, the sides of the U-shaped member then being released, to move into positions on opposite sides of the fin to be engaged thereby.

39. An exhibition device comprising, in combination, a rotatable main element having a plurality of exhibit-supports arranged around the same, means urging said main element to rotate, releasable detaining means to hold said main element with any one of said supports in a display position, said supports including one which is mounted for independent rotation on said main element, a constantly rotating member, and connecting means whereby a connection will be established between said rotating member and said rotatable support when the latter is brought to the display position.

40. An exhibition device comprising, in combination, a housing having a front sight-opening, a compartment in the rear of the housing and having a window through which an exhibit may be viewed directly from said sight opening, side compartments having forwardly-facing windows through which exhibits may be displayed, a side reflector facing each of the windows in the side compartments to reflect the exhibits there displayed across the path of vision from said sight-opening, and a central reflector between the window in the rear compartment and said sight-opening, and shiftable to different positions to co-operate with either one of said side reflectors to reflect to the sight-opening an exhibit displayed in the window of the side compartment corresponding to the side reflector used.

41. An exhibition device comprising, in combination, a housing having a front sight-opening, a compartment in the rear of the housing and having a window through which an exhibit may be viewed directly from said sight-opening, side compartments having forwardly-facing windows through which exhibits may be displayed, a side reflector facing each of the windows in the side compartments to reflect the exhibits there displayed across the path of vision from said sight-opening, and a central reflector between the window in the rear compartment and said sight-opening, and shiftable to different positions to co-operate with either one of said side reflectors to reflect to the sight-opening an exhibit displayed in the window of the side compartment corresponding to the side reflector used, said central reflector being so constructed as to permit a direct view therethrough of the exhibit at the window of the rear compartment.

42. An exhibition device comprising, in combination, a housing having a front sight-opening, a compartment in the rear of the housing and having a window through which an exhibit may be viewed directly from said sight-opening, side compartments, each having a window through which an exhibit may be displayed, a side reflector facing each of the windows in the side compartments to reflect the exhibit there displayed across the path of vision from said sight-opening, and a reflector between the window in the rear compartment and said sight-opening, and shiftable to different positions to co-operate with either one of said side reflectors to reflect to the sight-opening an exhibit displayed in the window of the side compartment corresponding to the side reflector used.

43. An exhibition device comprising, in combination, a housing having a front sight-opening, a compartment in the rear of the housing and having a window through which an exhibit may be viewed directly from sight-opening, side compartments, each having a window through which an exhibit may be displayed, a side reflector facing each of the windows in the side compartments to reflect the exhibit there displayed across the path of vision from said sight-opening, a central reflector between the window in the rear compartment and said sight-opening, and shiftable to different positions to co-operate with either one of said side reflectors to reflect to the sight-opening an exhibit displayed in the window of the side compartment corresponding to the side reflector used, and means to illuminate an exhibit at the window of the rear compartment or an exhibit at the window of the side compartment, determined by the position of the central reflector, to make either visible through the sight-opening.

44. An exhibition device comprising, in combination, a housing having a front sight-opening, a compartment in the rear of the housing and having a window through which an exhibit may be viewed directly from said sight-opening, side compartments, each having a window through which an exhibit may be displayed, a side reflector facing each of the windows in the side compartments to reflect the exhibit there displayed across the path of vision from said sight-opening, a central reflector between the window in the rear compartment and said sight-opening, and shiftable to different positions to co-operate with either one of said side reflectors to reflect to the sight-opening an exhibit displayed in the window of the side compartment corresponding to the side reflector used, an illuminating device for each of said windows, means controlled by the central reflector to determine which of the windows of the side compartments is to be illuminated, and means for controlling the illuminating device for the window of the rear compartment and the illuminating device for the window of the selected side compartment, so that the corresponding windows will be illuminated alternately.

45. An exhibition device comprising, in combination, a rotatable main element having a plurality of exhibit-supports arranged around the same, a constantly-rotating primary member, a slip connection between said primary rotating member and said rotatable main element to drive the latter, controlling means for said main element to cause successive exhibits to be brought to and then held in display position, said controlling means comprising a spring-pressed catch, and co-operating parts arranged at regular intervals on said main element to be engaged successively by said catch, so that, upon release of any one of said co-operating parts from the catch, the main element will be rotated one step and the next co-operating part engaged by said catch, said exhibit-supports including one which is mounted for independent rotation on said main element, a constantly-rotating secondary member to actuate the independently-rotatable support, and connecting means whereby a driving connection will be established between said secondary rotating member and said rotatable support when the latter is brought to the display position.

46. In an exhibition device comprising a housing having a sight-opening, in combination, two exhibit-carriers in said housing and outside of the range of vision from said sight-opening, each carrier having a plurality of exhibits thereon, means, including a reflector movable to different positions, to reflect an exhibit in display position on either of said carriers to the sight-opening, and an illuminating means controlled by said reflector, so that, upon shifting the latter to the position to determine the reflection of an exhibit in display position on one of said carriers to the sight-opening, illumination of an exhibit in display position on the other carrier will be prevented.

47. In an exhibition device comprising a housing having a sight-opening, in combination, two exhibit-carriers in said housing and outside of the range of vision from said sight-opening, each carrier having a plurality of exhibits thereon, means, including a reflector movable to different positions, to reflect an exhibit in display position on either of said carriers to the sight-opening, an illuminating means controlled by said reflector, so that, upon shifting the latter to the position to determine the reflection of an exhibit in display position on one of said carriers to the sight-opening, illumination of an exhibit in display position on the other carrier will be prevented, and devices, one for each carrier, for actuating the carriers step by step to bring successive exhibits to display position, the position of the reflector determining which one of the carriers will be actuated.

48. In an exhibition device comprising a housing having a sight-opening, in combination, two exhibit-carriers in said housing and outside of the range of vision from said sight-opening, each carrier having a plurality of exhibits thereon, means, including a reflector movable to different positions, to reflect an exhibit in display position on either of said carriers to the sight-opening, an illuminating means controlled by said reflector, so that, upon shifting the latter to the position to determine the reflection of an exhibit in display position on one of said carriers to the sight-opening, illumination of an exhibit in display position on the other carrier will be prevented, devices, one for each carrier, for actuating the carriers step by step, the position of the reflector determining which one of the carriers will be actuated, and controlling means for said illuminating means and for said devices whereby the selected carrier may be caused to move intermittently and the illuminating means may be caused to illuminate intermittently the exhibits brought to display position, the illumination of the exhibits and the shifting thereof taking place alternately.

49. In an exhibition device, in combination, a housing having a sight-opening, a plurality of exhibit-changing devices, each of which is constructed so that it may present a plurality of exhibits in succession at a display position which is outside the path of vision through the sight-opening, means constantly tending to actuate each of said exhibit-changing devices, a spring-pressed catch associated with each of said exhibit-changing devices to co-operate therewith at suitable intervals to prevent actuation of the exhibit-changing devices, an electro-magnet associated with each of said catches to withdraw the same to releasing position, a releasing circuit in which said electro-magnets are connected in parallel, a switch associated with each of said magnets to include it in the releasing circuit or to cut it out of the same, means to reflect to the sight-opening exhibits in display positions outside of the path of vision through the sight-opening, the reflecting means including a reflector shiftable to different positions to determine the exhibit-changing device of which an exhibit is to be viewed at the sight-opening, means whereby the reflector, when moved to a reflecting position for one of the exhibit-changing devices, will close the switch associated with the corresponding electro-magnet, and means to open and close the circuit at regular intervals to actuate the electro-magnet included in the circuit.

50. An exhibition device comprising, in combination, a housing having a sight-opening, a primary compartment having an exhibit-window through which an exhibit may be viewed directly from said sight-opening, secondary compartments having exhibit-windows outside of the path of vision from the sight-opening, an exhibit-changing device associated with each of said windows to display thereat a plurality of exhibits in succession, means, including a selectively positioned reflector, to reflect an exhibit at any one of said windows of the secondary compartments through the sight-opening, means to effect a step-by-step actuation of said exhibit-changing devices comprising an electro-magnetic controlling device for each of said exhibit-changing devices, a controlling circuit for the electro-magnetic controlling devices for the exhibit-changing devices at the windows of the secondary compartments, and a reflector-controlled switch for each controlling device associated with an exhibit-changing device for a secondary compartment to cut the controlling device into or out of the controlling circuit.

51. An exhibition device comprising, in combination, a housing having a sight-opening, a primary compartment having an exhibit-window through which an exhibit may be viewed directly from said sight-opening, secondary compartments having exhibit-windows outside of the path of vision from the sight-opening, an exhibit-changing device associated with each of said windows to display thereat a plurality of exhibits in succession, means, including a selectively positioned reflector, to reflect an exhibit at any one of said windows of the secondary compartments through the sight-opening, means to effect a step-by-step actuation of said exhibit-changing devices comprising an electro-magnetic controlling device for each of said exhibit-changing devices, a controlling circuit for the electro-magnetic controlling devices for the exhibit-changing devices at the windows of the secondary compartments, a reflector-controlled switch for each controlling device associated with an exhibit-changing device for a secondary compartment to cut the controlling device into or out of the controlling circuit, an electric-lighting device associated with each window to illuminate the exhibit therein, a lighting circuit for said lighting devices associated with the windows of the secondary compartments, and a reflector-controlled switch associated with each of said lighting devices for the windows of the secondary compartments to cut the same into the lighting circuit or out of the same.

52. An exhibition device comprising, in combination, a housing having a sight-opening, a primary compartment having an exhibit-window through which an exhibit may be viewed directly from said sight-opening, secondary compartments having exhibit-windows outside of the path of vision from the sight-opening, an exhibit-changing device associated with each of said windows to display thereat a plurality of exhibits in succession, means, including a selectively positioned reflector, to reflect an exhibit at any one of said windows of the secondary compartments through the sight-opening, means to effect a step-by-step actuation of said exhibit-changing devices comprising an electro-magnetic controlling device for each of said exhibit-changing devices, a controlling circuit for the electro-magnetic controlling devices for the exhibit-changing devices at the windows of the secondary compartments, a reflector-controlled switch for each controlling device associated with an exhibit-changing device for a secondary compartment to cut the controlling device into or out of the controlling circuit, an electric-lighting device associated with each window to illuminate the exhibit therein, a lighting circuit for said lighting devices associated with the windows of the secondary compartments, a reflector-controlled switch associated with each of said lighting devices for the windows of the secondary compartments to cut the same into the lighting circuit or out of the same, a controlling circuit for the primary compartment electro-magnetic controlling device, a lighting circuit for the lighting device associated with the window of the primary compartment, and means for opening and closing alternately the circuits for the electro-magnetic controlling devices for the primary compartment and the secondary compartment selected by the reflector and to open and close the corresponding lighting circuits alternately but in reverse order.

53. An exhibition device comprising, in combination, a housing having a sight-opening, a primary compartment having an exhibit-window through which an exhibit may be viewed directly from said sight-opening, secondary compartments having exhibit-windows outside of the path of vision from the sight-opening, an exhibit-changing device associated with each of said windows to display thereat a plurality of exhibits in succession, means, including a selectively positioned reflector, to reflect an exhibit at any one of said windows of the secondary compartments through the sight-opening, means to effect a step-by-step actuation of said exhibit-changing devices comprising an electro-magnetic controlling device for each of said exhibit-changing devices, a controlling circuit for the electro-magnetic controlling devices for the exhibit-changing devices at the windows of the secondary compartments, a reflector-controlled switch for each controlling device associated with an exhibit-changing device for a secondary compartment to cut the controlling device into or out of the controlling circuit, a controlling circuit for the electro-magnetic controlling device for the exhibit-changing device associated with the primary compartment, and means for opening and closing the controlling circuits alternately.

54. In an exhibition device, in combination, a housing having a sight through which exhibits in the interior of the housing may be viewed and a border of translucent material therearound, a primary compartment having an exhibit-window opposite said sight, secondary compartments having exhibit-windows outside of the path of vision through said sight, means, including a reflector shiftable to different positions, to reflect an exhibit at any one of said exhibit-windows of the secondary compartments to the sight, an exhibit-changing device for each of said compartments to display at the exhibit-window thereof a plurality of exhibits in succession, a source of electricity, comprising a positive terminal and a negative terminal, a plurality of front electric lights of such voltage as to take the current directly from the source of electricity, said front electric lights being arranged around the sight and behind the translucent material, a plurality of rear electric lights, of lower voltage than the front lights, arranged to throw their light directly on the exhibit-window of the primary compartment, a plurality of sets of side electric lights, of less voltage than the front lights and associated respectively with the windows of the secondary compartments, a front-light circuit connected directly to the source of electricity, a rear-light circuit, a main side-light circuit, means to step down the voltage for the rear-light circuit and the main side-light circuit, a side-light switching device to cut sets of side lights into and out of the side-light circuit, a motor, a motor-circuit connected directly with the source of electricity, and a device actuated by said motor to open and close alternately the rear-light circuit and the main side-light circuit.

55. In an exhibition device, in combination, a housing having a sight through which exhibits in the interior of the housing may be viewed and a border of translucent material therearound, a primary compartment having an exhibit-window opposite said sight, secondary compartments having exhibit-windows outside of the path of vision through said sight, means, including a reflector shiftable to different positions, to reflect an exhibit at any one of said exhibit-windows of the secondary compartments to the sight, an exhibit-changing device for each of said compartments to display at the exhibit-window thereof a plurality of exhibits in succession, a source of electricity comprising a positive terminal and a negative terminal, a plurality of front electric lights of such voltage as to take the current directly from the source of electricity, said front electric lights being arranged around the sight and behind the translucent material, a plurality of rear electric lights, of lower voltage than the front lights, arranged to throw their light directly on the exhibit-window of the primary compartment, a plurality of sets of side electric lights, of less voltage than the front lights and associated respectively with the windows of the secondary compartments, a front-light circuit connected directly to the source of electricity, a rear-light circuit, a main side-light circuit, a converter for use, if the current at the source is a direct current, to change the supply current to an alternating current, a transformer to step down the voltage for the rear-light circuit and the main side-light circuit, if direct, to be led first to the converter and then to the transformer, a side-light switching device to cut sets of side lights into and out of the side-light circuit, a motor, a motor-circuit connected directly with the source of electricity, and a device actuated by said motor to open and close alternately the rear-light circuit and the main side-light circuit.

56. In an exhibition device, in combination, a housing having a sight, through which exhibits in the interior of the housing may be viewed, and a border of translucent material therearound, a primary compartment having an exhibit-window opposite said sight, secondary compartments having exhibit-windows outside of the path of vision through said sight, means, including a reflector shiftable to different positions, to reflect an exhibit at any one of said exhibit-windows of the secondary compartments to the sight, an exhibit-changing device for each of said compartments to display at the exhibit-window thereof a plurality of exhibits in succession, a source of electricity comprising a positive terminal and a negative terminal, a plurality of front electric lights of such voltage as to take the current directly from the source of electricity, said front electric lights being arranged around the sight and behind the translucent material, a plurality of rear electric lights of lower voltage than the front lights arranged to throw their light directly on the exhibit-window of the primary compartment, a plurality of sets of side electric lights of less voltage than the front lights and associated respectively with the windows of the secondary compartments, a front-light circuit connected directly to the source of electricity, a rear-light circuit, a main side-light circuit, means to step down the voltage for the rear-light circuit and the main side-light circuit, a side-light switching device to cut sets of side-lights into and out of the side-light circuit, a motor, a motor-circuit connected directly with the source of electricity, means driven by said motor for driving all of said exhibit-changing devices, electro-magnetic devices, one for each exhibit-changing device, for controlling the actuation of the latter, a controlling circuit for the primary compartment electro-magnetic device, a controlling circuit for the secondary compartment electro-magnetic devices, a switching device to cut any of the last-mentioned electro-magnetic devices into or out of the corresponding circuit, and a device actuated by said motor to open and close alternately the rear-light circuit and the main side-light circuit and concomitantly to close and open respectively the corresponding controlling circuits for the electro-magnetic devices.

57. An exhibition device comprising, in combination, a housing having a front sight-opening, a rear rotatable exhibit-carrier, side rotatable exhibit-carriers, means for reflecting exhibits on the side exhibit-carriers to the sight-opening, and means for rotating all of said exhibit-carriers comprising wheels, individual to said exhibit-carriers and having yieldable connections therewith, and means to rotate said wheels continuously.

58. An exhibition device comprising, in combination, a housing having a front sight-opening, a rear rotatable exhibit-carrier, side rotatable exhibit-carriers, means for reflecting exhibits on the side exhibit-carriers to the sight-opening, means for rotating all of said exhibit-carriers comprising wheels, individual to said exhibit-carriers and having frictional driving connections therewith, and means to rotate said wheels continuously, and a holding device for each of said exhibit-carriers to overcome the frictional driving connection between the same and the corresponding wheel.

59. An exhibition device comprising, in combination, a housing having a front sight-opening, a rear rotatable exhibit-carrier, side rotatable exhibit-carriers, means for reflecting exhibits on the side exhibit-carriers to the sight-opening, means for rotating all of said exhibit-carriers comprising wheels, individual to said exhibit-carriers and having frictional driving connections therewith, and means to rotate said wheels continuously, a normally effective holding device for each of said exhibit-carriers to overcome the frictional driving connection between the same and the corresponding wheel, and means to release alternately the holding device for the rear exhibit-carrier and the holding device for any selected side exhibit-carrier.

60. An exhibition device comprising, in combination, a housing having a front sight-opening, a rear rotatable exhibit-carrier, side rotatable exhibit-carriers, means for reflecting exhibits on the side exhibit-carriers to the sight-opening, means for rotating all of said exhibit-carriers comprising wheels, individual to said carriers and having yielding connections therewith, and means to rotate said wheels continuously, and means for holding said carriers against movement.

ALFRED E. OSWALD.

Witnesses:
CATHERINE A. NEWELL,
JENNIE P. THORNE.